United States Patent [19]

Davis et al.

[11] Patent Number: 5,388,025
[45] Date of Patent: Feb. 7, 1995

[54] RECHARGEABLE ELECTRICAL ENERGY STORAGE DEVICE HAVING ORGANOMETALLIC ELECTRODES

[75] Inventors: James L. Davis, Coral Springs; John K. Arledge, Lauderhill; Thomas J. Swirbel, Davie; Melanie Williams, Ft. Lauderdale, all of Fla.

[73] Assignee: Motorola, Inc., Schaumburg, Ill.

[21] Appl. No.: 937,776

[22] Filed: Sep. 1, 1992

[51] Int. Cl.6 ............................................... H01G 9/00
[52] U.S. Cl. .................................................... 361/502
[58] Field of Search ............... 361/502, 508, 512, 516; 29/25.41, 25.03; 204/291, 280, 292–294; 429/213, 215

[56] References Cited

U.S. PATENT DOCUMENTS

| | | | |
|---|---|---|---|
| 4,184,192 | 1/1980 | Yoshida et al. | 361/433 |
| 4,376,709 | 3/1983 | Johnson et al. | 252/1 |
| 4,526,708 | 7/1985 | Elsenbaumer et al. | 252/518 |
| 4,547,439 | 10/1985 | Genies | 429/105 |
| 4,668,596 | 5/1987 | Shacklette et al. | 429/194 |
| 4,795,687 | 1/1989 | Suzuki et al. | 429/213 |
| 4,857,167 | 8/1989 | Bashkin et al. | 204/435 |
| 4,857,423 | 8/1989 | Abraham et al. | 429/194 |
| 4,945,014 | 7/1990 | Miyabayashi . | |
| 4,992,910 | 2/1991 | Evans | 361/502 |
| 5,047,899 | 9/1991 | Bruder | 361/502 |
| 5,079,674 | 1/1992 | Malaspina | 361/502 |
| 5,124,022 | 6/1992 | Evans, II et al. | 361/502 |

FOREIGN PATENT DOCUMENTS

| | | |
|---|---|---|
| 1270296 | 6/1990 | Canada . |
| 59-46760 | 3/1984 | Japan . |

*Primary Examiner*—Bruce A. Reynolds
*Assistant Examiner*—Michael D. Switzer
*Attorney, Agent, or Firm*—Dale W. Dorinski

[57] ABSTRACT

A rechargeable electrical energy storage device (20). The cell has two electrodes (28, 36) constructed from a similar organometallic compound (30), and the electrodes are electrically connected by an ion carrying electrolyte (32). The electrodes are also physically separated from each other by a barrier (34) that will pass ions but not electrons. In one embodiment of the invention, the electrodes are ferrocene, and the electrolyte is sulfuric acid.

17 Claims, 7 Drawing Sheets

RECHARGEABLE ELECTRICAL ENERGY STORAGE DEVICE HAVING ORGANOMETALLIC ELECTRODES

TECHNICAL FIELD

This invention relates generally to energy storage devices, and more particularly to energy storage devices employing organometallic electrodes.

BACKGROUND

The history of electrochemical energy storage devices, especially capacitors and batteries, has involved attempts to reduce package size while increasing the electrical energy storage capacity. Recent advances in battery design have included improvements in life, efficiency and energy density by making improved lead-acid, nickel-cadmium, nickel-zinc and various primary cells. However, although many of the devices embracing the recent technological advances have filled a need, there continues to be a requirement for efficient high power density electrical storage devices which withstand the rigors of continuous use and virtually unlimited cycling.

Recent technological advances in electrochemical energy storage devices have included supercapacitors, ultracapacitors, and pseudocapacitors.

Ultracapacitors are a new breed of energy storage devices that are completely distinctive from batteries. These devices are true capacitors in that energy is stored by the separation of positive and negative charges. However, unlike traditional capacitors such as parallel plate capacitor, ultracapacitors store charge at the atomic level between the electrode and the electrolyte. This charge storage mechanism is highly efficient and can produce high capacitances up to several hundred Farads in a compact package. Ultracapacitors are available in two basic varieties depending on the composition of the electrodes. These devices are generally termed "supercapacitors" and "ultracapacitors" to distinguish them. Supercapacitors use activated carbon as the electrode elements. While this material is inexpensive, the high internal resistance of the activated carbon limits the power available from the storage device. The supercapacitor is an electrochemical cell or combination of cells consisting of two electrodes, an electrolyte and a container. The electrolyte may be acidic, basic or neutral, such as sulfuric acid, potassium hydroxide or sodium sulfate. Current-collector grids or meshes are also employed in the electrode assembly, if desired.

An alternative technology is to use electrodes composed of one or more oxides of ruthenium, tantalum, rhodium, iridium, cobalt, nickel, molybdenum, tungsten or vanadium deposited on a metal foil. Devices made using these materials for electrodes are termed "ultracapacitors" or "pseudocapacitors", and are described in further detail in Canadian Patent 1,270,296, incorporated herein by reference. Although these devices have much lower internal resistance and hence, higher power densities than carbon-based supercapacitors, the materials used are very expensive. Consequently, construction of the precious metal ultracapacitors can cost several hundred dollars each.

Figure 1:
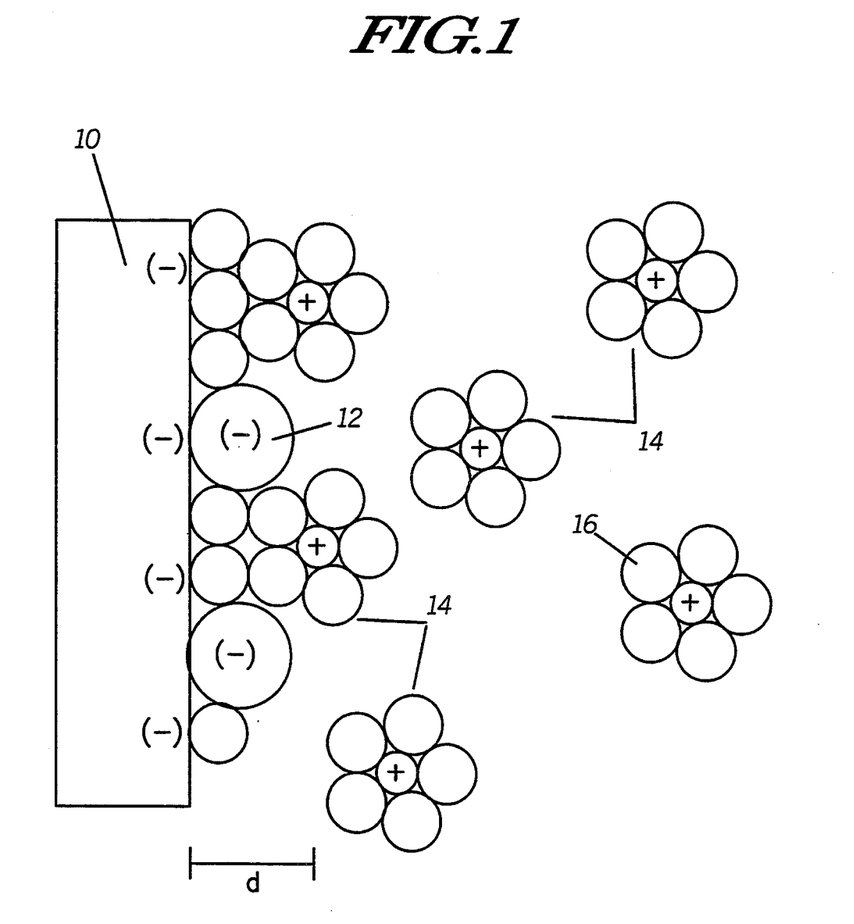
FIG. 1 is a schematic representation of double layer capacitance.

Ultracapacitors store energy by two processes which are shown in FIG. 1. The first is the separation of positive and negative charges at the interface between the electrode and the electrolyte. This phenomenon is called double layer capacitance. The electrical double layer is present at virtually all interfaces between electrodes and electrolytes and is a fundamental property of electrochemical systems. The double layer consists of sorbed ions 12 that are specifically sorbed on the electrode 10 from solution as well as solvated ions. The proximity between the electrode 10 and solvated ions 14 is limited by the presence of the solvation sheath 16 around the ions, hence, the solvated ions cannot sorb on the electrode and only approach to some distance d. Therefore, in the case of these solvated ions 14, there exists positive and negative charges separated by a distance d (see FIG. 1), which produce a true capacitance in the electrical sense. The second charge storage mechanism is the sorbtion of ions on the surface of the electrode. This phenomenon is called pseudocapacitance. The key point to note is that pseudocapacitance is not an electrostatic capacitance like that of the double layer or such as occurring in a parallel plate capacitor. Hence, the term "pseudo" (meaning false) capacitance. Instead, pseudocapacitance is merely a convenient formalism used to express the phenomenon of ion adsorption on electrodes. The carbon based supercapacitors as developed by SOHIO, NEC, Panasonic, and others rely primarily on the double layer capacitance effect for charge storage. These devices do, however, contain a small amount of pseudocapacitance as this effect is unavoidable.

The physical processes involved in energy storage in a supercapacitor or ultracapacitor are distinctly different from the electrochemical oxidation reduction processes responsible for charge storage in batteries. Hence, these devices represent a class of energy storage materials completely separate from batteries.

Clearly, a need exists for an electrical energy storage device that combines the desirable features of precious metal ultracapacitors and conventional electrochemical batteries, yet can be manufactured at a reasonable cost without the use of rare earth metals.

SUMMARY OF THE INVENTION

Briefly, according to the invention, there is provided a rechargeable device for storage of electrical energy. The device has two electrodes constructed from a similar organometallic compound, and the electrodes are electrically connected by an ion carrying electrolyte. The electrodes are also physically separated from each other by a barrier that will pass ions but not electrons. In another embodiment of the invention, the electrodes are ferrocene.

Another embodiment of the invention involves a process for storing electrical energy in an electrochemical cell having two electrodes, at least one of the electrodes comprising an organometallic compound. The electrodes are electrically connected by an ion carrying electrolyte and physically separated by a barrier that will pass ions but not electrons. The process comprises the steps of:

1) charging the cell by providing an electrical current to the electrodes;
2) maintaining a potential on the cell until a desired state of charge is obtained; and
3) discharging the cell by using it to power an electrical device.

Yet another embodiment of the invention comprises a rechargeable battery for a portable radio. The rechargeable battery comprises a housing having electrical contacts for charging and discharging. One or more electrochemical cells are contained within the housing, each cell having two electrodes constructed of a similar organometallic compound. The electrodes are electrically connected by an ion carrying electrolyte and physically separated by a barrier that will pass ions but not electrons. Each electrochemical cell is electrically connected to the other cells and to the electrical contacts in the housing.

DETAILED DESCRIPTION OF THE PREFERRED EMBODIMENT

This invention describes the use of inexpensive organometallic substances such as ferrocene, which cost less than ten cents per gram. The incorporation of ferrocene into the ultracapacitor electrode provides the low internal resistance available from precious metal oxide ultracapacitors but at a cost comparable to that of carbon-based supercapacitors. An additional advantage of using ferrocene is that since it contains both a metallic component, for example, iron and an organic component, for example, two cyclopentadienyl rings, this device is, in effect, a combination or hybrid supercapacitor and ultracapacitor. Furthermore, since the capacitance is dependent upon dispersing the metal, organometallic compounds inherently contain metal in the most highly dispersed state and, therefore, offer the highest possible theoretical energy density.

Figure 2:
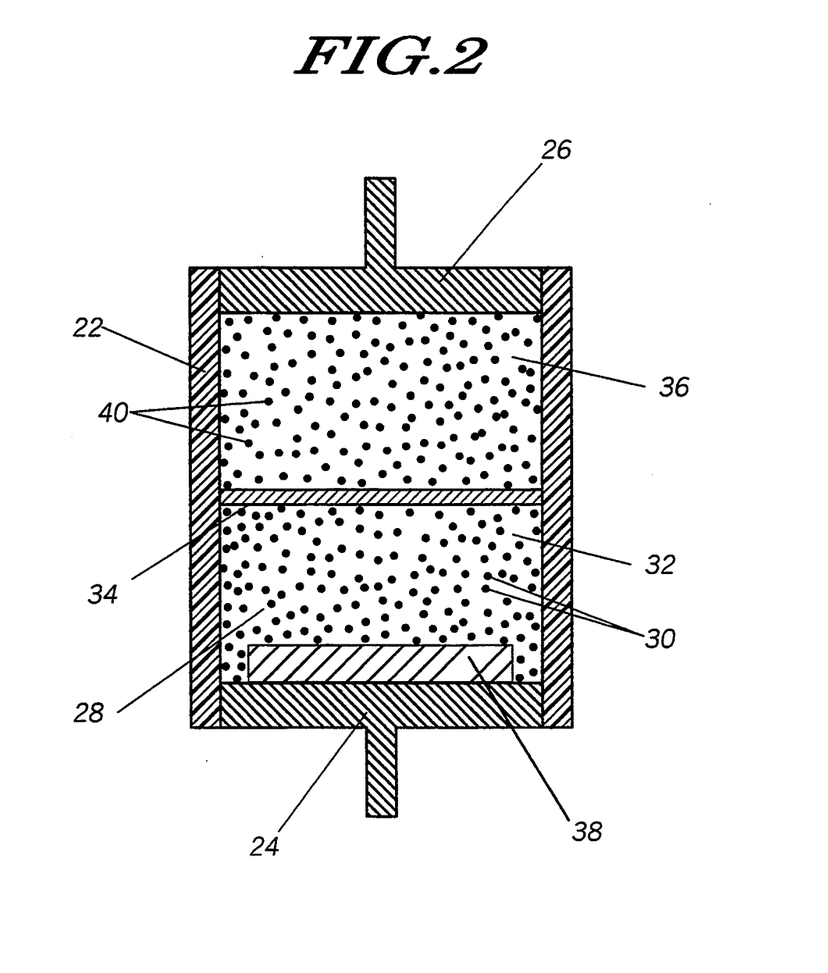
FIG. 2 is a cross-sectional view of an electrical energy storage device in accordance with the invention.

A description of the invention is now presented and is best understood from a consideration of the following text in conjunction with the drawing figures, in which like reference numerals are carried forward. Referring now to FIG. 2, an energy storage device 20 is constructed in a housing 22. The housing 22 is typically a cylinder with openings at opposite ends but may be other shapes as desired by the individual designer, for example, cubes or rectangular solids. One end of the housing 22 has a first metal connector 24 inserted therein to provide an electrical contact to the energy storage device. The opening at the opposite end of the housing 22 has a second metal connector 26 provided for a likewise purpose. The material employed for the housing 22 is a nonconductive or dielectric material, for example, polyvinylchloride, nylon, polyethylene, polypropylene, or other nonconductive materials. A first electrode 28 is formed by mixing an organometallic compound 30 with an electrolyte 32 in order to form a wet slurry. This wet slurry is then packed into the housing 22 to form a first electrode 28. A separator 34, which is composed of a dielectric material which will pass ions but not electrons, is then placed on the first electrode 28. The separator material 34 provides a barrier between the first electrode and the second electrode and is typically an ion permeable membrane such as hydrophyllic plastic films, glass, papers, felt, cellulosic materials, gels, porous plastics, ion exchange films, screens, beads, etc. A second electrode 36 is now formed in a manner similar to the first electrode and placed inside the housing directly on top of the separator 34. The second metal connector 26 is now inserted into the housing to provide a leak proof energy storage device 20. Electrolytes used for the energy storage device may be a number of aqueous or non-aqueous materials, such as acids, bases, or salts and solutions thereof. Organometallic compounds of interest in the production of the device are materials such as ferrocene, cobalt acetate tetrahydrate, tetrasodium salt of nickel phthalocyaninetetrasulfonic acid, metal acetylacetonates, metal bipyridines, metal porphyrins, metallocenes (an organometallic coordination compound obtained as a cypentadienyl derivative of a transition metal or a metal halide), and their derivatives. Other organic compounds having similar properties and constructions may be apparent to the reader and still fall within the scope of the invention.

In the preferred embodiment of the invention, the organometallic compound is ferrocene and the electrolyte is dilute sulfuric acid. Because the organometallic materials used for both electrodes are similar, either the first metal connector 24 or the second metal connector 26 may serve as the positive or negative connection of the electrical energy storage device, depending upon how connections are made when the device is charged.

Figure 3:
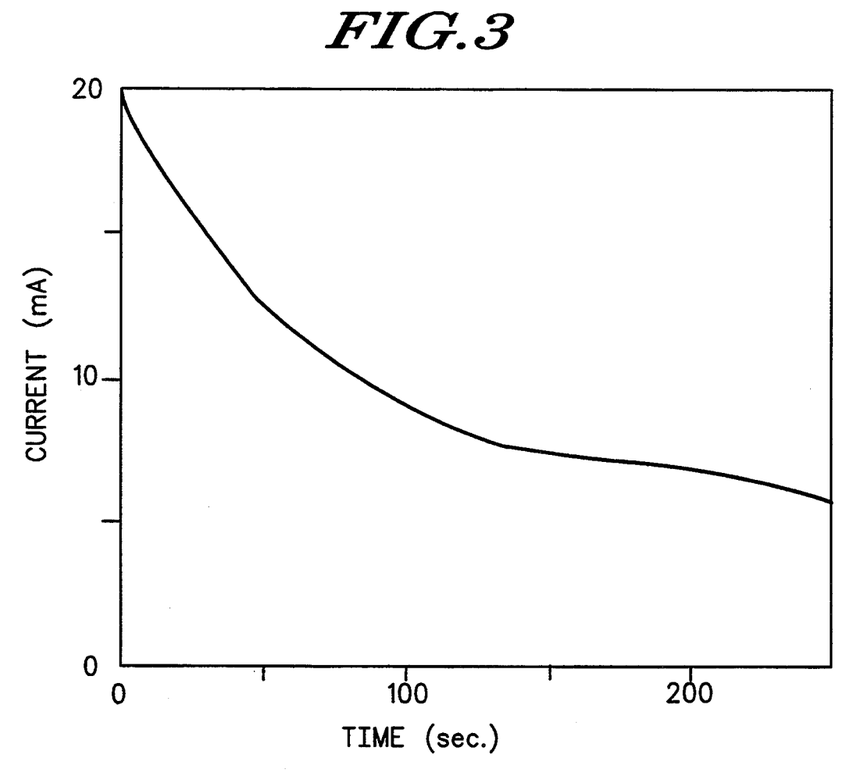
FIG. 3 is a charging curve of an electrical energy storage device made in accordance with the invention.

In order to charge the electrical energy storage device constructed above, a potential of three volts was placed between the first metal connector 24 and the second metal connector 26. The resulting charge curve is shown in FIG. 3. The open circuit voltage of the device after charging for five minutes was 0.857 volts DC. Different types of separators, different types of organometallic compounds, and different electrolytes have been shown to increase the stability of the device, lower the self-discharge rate, and increase the open circuit voltage. For example, thicker filter papers used as separators have been found to provide higher open circuit voltage.

Example 1

An electrical energy storage device was made in accordance with the invention. A polypropylene plastic cylinder was used as the housing. One end of the housing was fitted with a stainless steel bolt extending into the interior of the housing. The housing was partially filled (about halfway) with ferrocene powder. The powder was then wet with a solution of dilute sulfuric acid (about 10% $H_2SO_4$). A circular piece of Whatman filter paper, approximately the same diameter as the interior of the housing, was placed on top of the wet ferrocene powder, acting as a separator. Additional ferrocene was packed on top of the separator, and this ferrocene was wet with the dilute sulfuric acid electrolyte. The top of the plastic housing was then sealed with another stainless steel fitting, in a manner similar to the first. The device was charged at 1, 1.75, and 2 V for periods of time ranging from two-to-five minutes.

Figure 5:
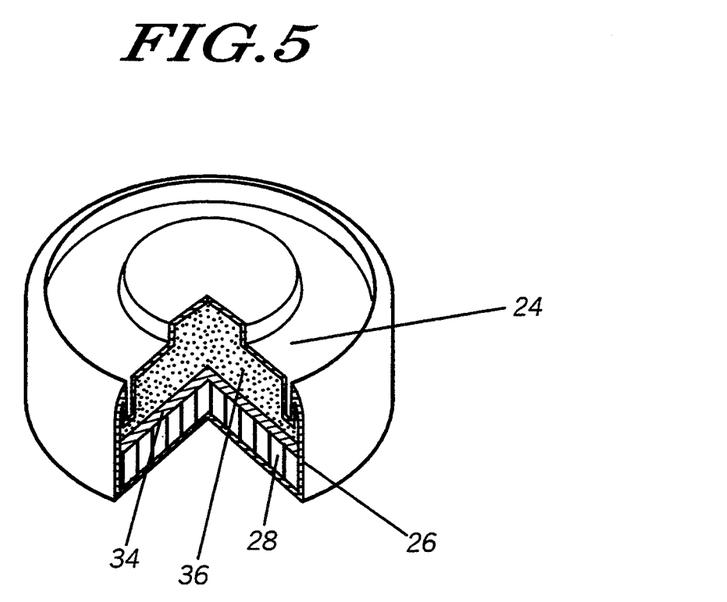
FIG. 5 is an isometric cutaway view of a "button" cell in accordance with the invention.
Figure 6:
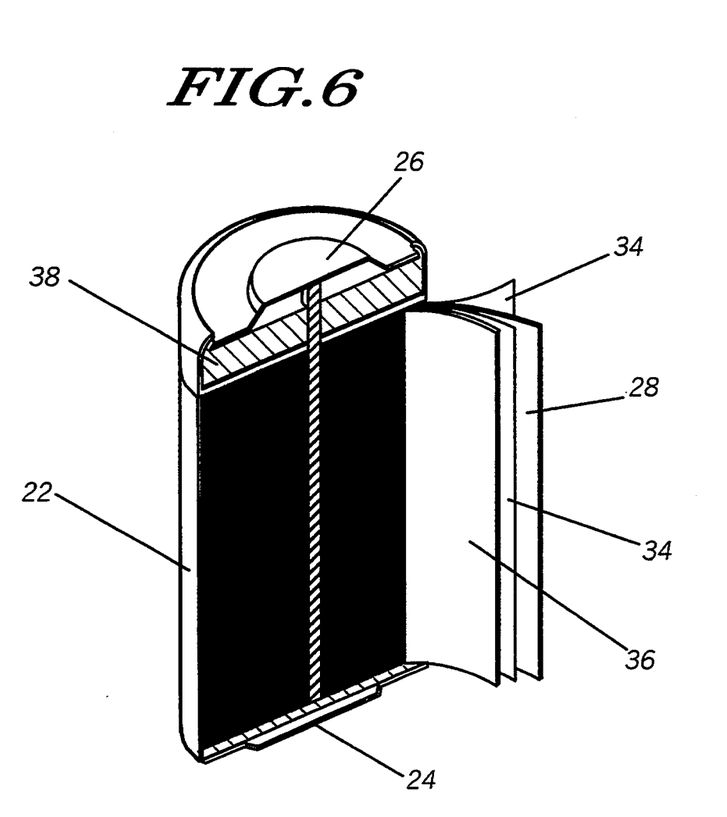
FIG. 6 is an isometric cutaway view of a "jelly-roll" cell in accordance with the invention.

It should now be apparent to the reader that the instant invention combines the advantages found in capacitors with those found in batteries but is constructed in a manner unlike either. For example, batteries have two electrodes of dissimilar materials whereas the energy storage device of the instant invention comprises electrodes made from similar organometallic materials. The ion path between the anode and the cathode is via an electrolyte through a separator. The electrolyte being an ionizable salt dissolved within a solvent, for example, sulfuric acid dissolved in water. The electrolyte may be solid or liquid, aqueous or nonaqueous. In keeping with the terminology used in the battery industry, the negative electrode is also known as the anode and the positive electrode is also known as the cathode. Electrons move from the negative to the positive by an external circuit during the work. Additional types of construction of energy storage devices may be seen in FIGS. 5 and 6 where alternate configurations of the anode, cathode and separator are seen. In FIG. 5 a sandwich type of construction is employed to provide a "button" energy storage device, and in FIG. 6 a typical jelly-roll type of energy storage device is shown.

In order to provide a useful electrical energy storage device, the storage device 20 must be charged. This is performed by imparting an electrical potential across the electrical connectors 24 and 26 and maintaining the potential on the device 20 until a desired state of charge is obtained. During use, the cell is discharged by connecting the electrical connectors 24 and 26 to an electrical device such as a portable radio, an electric motor, light emitting diode, or other electrical device. Because the electrical energy storage device herein described is not a primary cell but can be recharged, the process of charging and discharging may be repeated over and over, creating a rechargeable cell. That is, after discharging the storage device by powering an electrical device, the storage device may be recharged by reapplying the potential to the connectors, and then discharged again.

In an alternate embodiment of the invention, the organometallic powder may be blended with or coated with a metallic material such as silver, aluminum, gold, cobalt, chromium, copper, iron, iridium, magnesium, manganese, molybdenum, nickel, palladium, platinum, ruthenium, zinc, stainless steel, or alloys of these materials. If the metal is to be mixed with the organometallic powder, the metal can be in the form of flakes, fibers, particles, or filings. The amount of metal added to the organometallic mixture is typically small, since high values result in shorting of the electrodes together. Introduction of the metallic material reduces the internal resistance of the battery, thereby increasing the power density. The metal may be mixed into one or both of the electrodes and/or alternatively, a multicell energy storage device may be built where the metal is incorporated into some or all of the cells.

Figure 4:
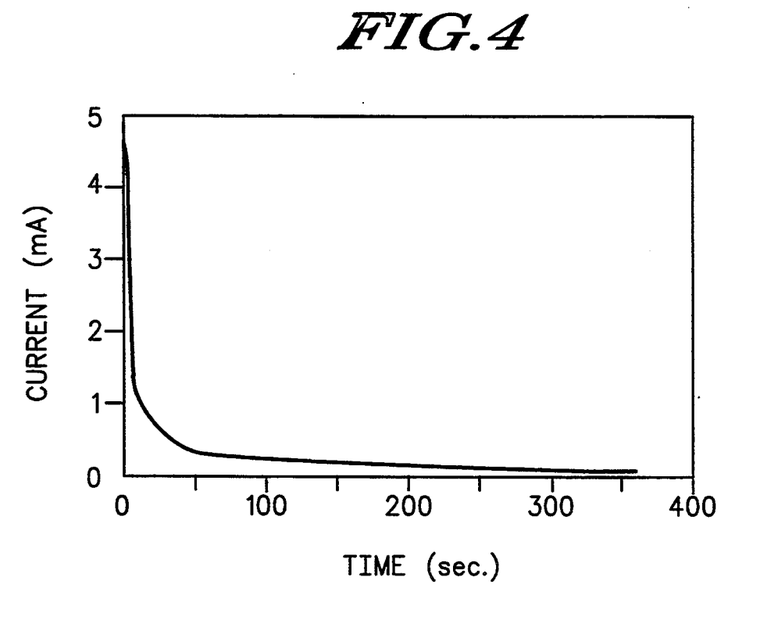
FIG. 4 is a charging curve of an electrical energy storage device, where the electrodes are filled with metal particles in accordance with the invention.

A device similar to that shown in FIG. 2 was constructed with zinc filings mixed into the first electrode 32 of a ferrocene based energy storage device and was charged in a manner as described above. The open circuit voltage of a device after six minutes of charging was 0.992 volts. The charging curve is given in FIG. 4. Depending upon the construction, an electron or current collector or grid 38 may be added to the device if desired. The current collector 38 is typically formed from a metal such as cobalt, copper, gold, iron, manganese, nickel, platinum, silver, tantalum, titanium, zinc, and alloys thereof and may be additionally coated with the organometallic compound used in the construction of the battery. Obviously, mixtures of organometallic compounds may also be employed to boost the efficiency or power density of the device.

An electrical energy storage device is made using ferrocene mixed with other materials that are commonly used in supercapacitors such as carbon, metal oxides, metal sulfides, metal sulfates, metal phosphates, metal nitrides, etc. The device may consist of these substances mixed together as powders and used in this manner as the electrodes. Alternately, the device may consist of a pure powder ferrocene electrode and an electrode composed of one or more materials selected from the following group: carbon, metal oxides, metal sulfides, and metal sulfates.

Another embodiment is to deposit the organometallic electrode material on a base metal such as titanium or iron. The device can consist of mixed electrodes containing ferrocene and/or other substances such as metal oxides, metal sulfides, and metal phosphates. Alternatively, the device can consist of a coating such as metal oxides, metal sulfides, and metal phosphates, deposited on titanium, iron or some other metal.

A further embodiment is replacing ferrocene in the devices described above with other organometallics including carboxylates, acrylates, aromatic acetyls, sulfur compound, nitrogen compounds, porphyrinsalkoxides, alkanes, hydrates, bicyclos, phosphoric compounds, silicon compounds, etc. Metals which may be used for this application include, but are not limited to, the following metals:

| | |
|---|---|
| Group I B | Cu, Ag, Au |
| Group II B | Zn, Cd, Hg |
| Group IV B | Ti, Zr, Hf |
| Group V B | V, Nb, Ta |
| Group VI B | Cr, Mo, W |
| Group VII B | Mn, Tc, Re |
| Group VIII B | Fe, Co, Ni, Ru, Rh, Pd, Os, Ir, Pt |
| Group IA & IIA | Ca, Mg, Li, Na, and K |

Finally, the organic and inorganic elements can be combined to form an organometallic such as Metal (Bipyridine)$_3$, or they can be combined into an organometallic polymer. This polymer may consist of an organic or organometallic backbone with organic or organometallic ligands such as:

Alternatively, the polymer may be an intercalation compound containing the metals listed above, or a combination of the organometallic polymers described above.

Example 2

Figure 8:
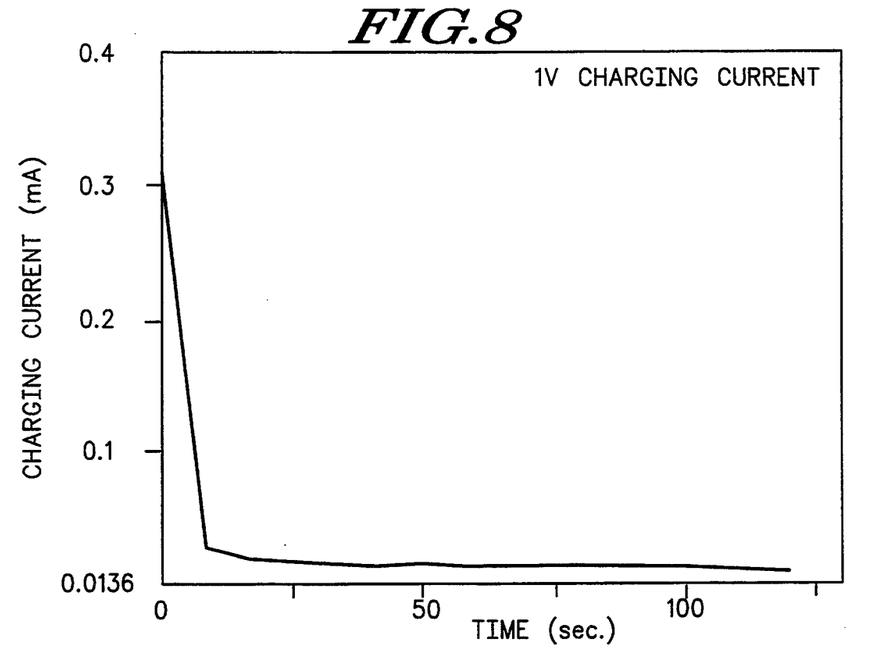
FIG. 8 is a charging curve of an electrical energy storage device made in accordance with the invention.

Electrical energy storage devices were built using cobalt acetate tetrahydrate in the same manner as ferrocene was used in Example 1. A ten percent solution of sulfuric acid was used as the electrolyte. The device was charged at 1, 1.75, and 2 V for periods of time ranging from two-to-five minutes. Prior to charging at 1 V, no voltage difference was observed between the two cobalt acetate tetrahydrate electrodes. The charging curve is given in FIG. 8. After charging for two minutes at 1 V, a voltage difference of 0.404 V was observed between the electrodes. This voltage decayed to 0.302 V after three minutes due to self discharge of the device.

Figure 9:
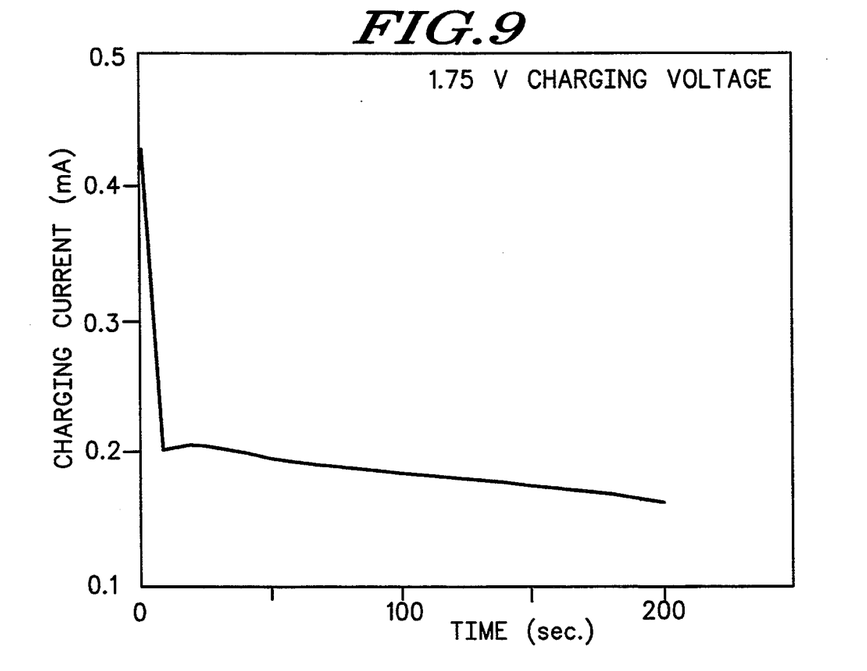
FIG. 9 is a charging curve of an electrical energy storage device made in accordance with the invention.

Prior to charging at 1.75 V, no voltage difference was observed between the two cobalt acetate tetrahydrate electrodes. The charging curve is given in FIG. 9. After charging for 3.5 minutes at 1.75 V, a voltage difference of 0.831 V was observed between the electrodes. This voltage decayed to 0.707 V after three minutes due to self discharge of the device.

Figure 10:
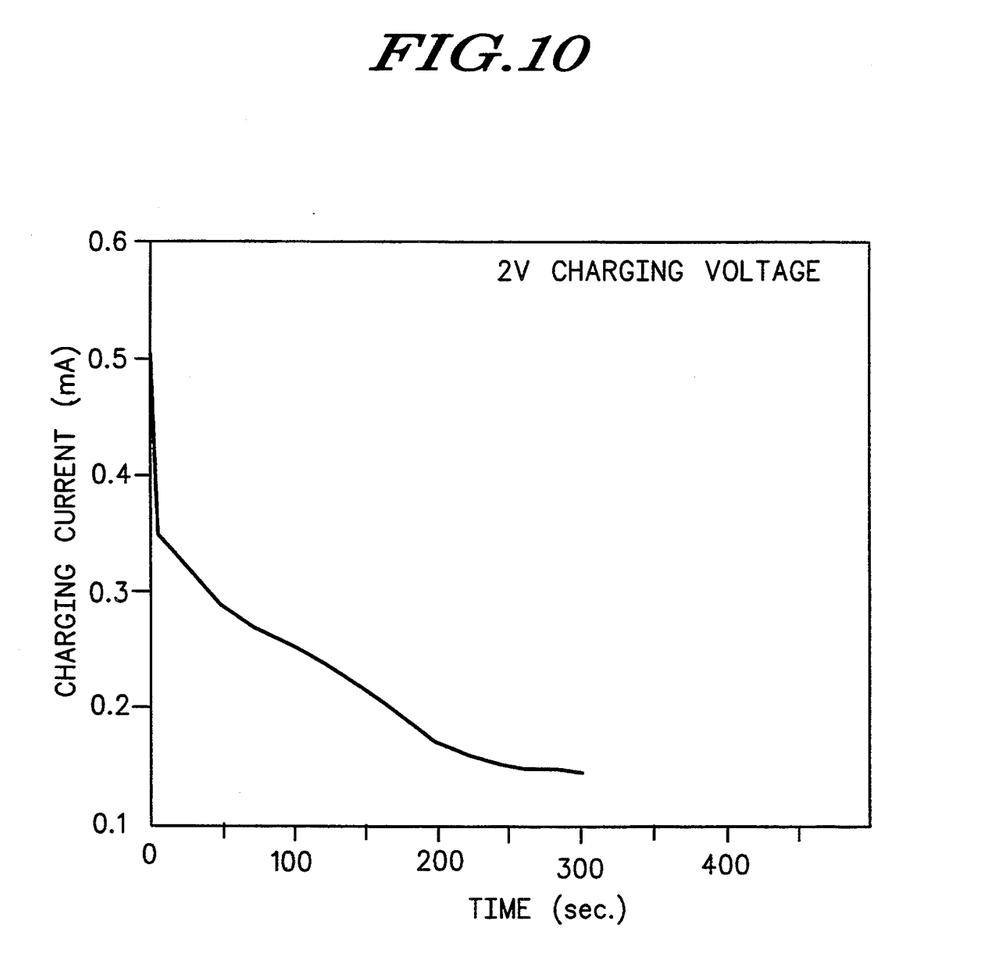
FIG. 10 is another charging curve of an electrical energy storage device made in accordance with the invention.

Prior to charging at 2 V, no voltage difference was observed between the two cobalt acetate tetrahydrate electrodes. The charging curve is given in FIG. 10. After charging for five minutes at 2 V, a voltage difference of 0.725 V was observed between the electrodes. This voltage decayed to 0.701 V after ten minutes due to self discharge of the device.

Example 3

Another electrical energy storage device was built using nickel phthalocyaninetetrasulfonic acid, tetrasodium salt. The device did not exhibit any potential difference between the electrodes prior to charging. After charging for one minute, a potential difference of 0.326 V was observed. The charging characteristics of this organometallic were too rapid to be accurately recorded. The charging current leveled off at 0.123 mA within ten seconds after charging was initiated.

Example 4

The behavior of an electrical energy storage device made with manganese acetylacetonate was also tested. The material was found to be extremely soluble in the sulfuric acid electrolyte. Attempts to charge the capacitor were unsuccessful, perhaps due to the high solubility of this material in the electrolyte.

Figure 7:
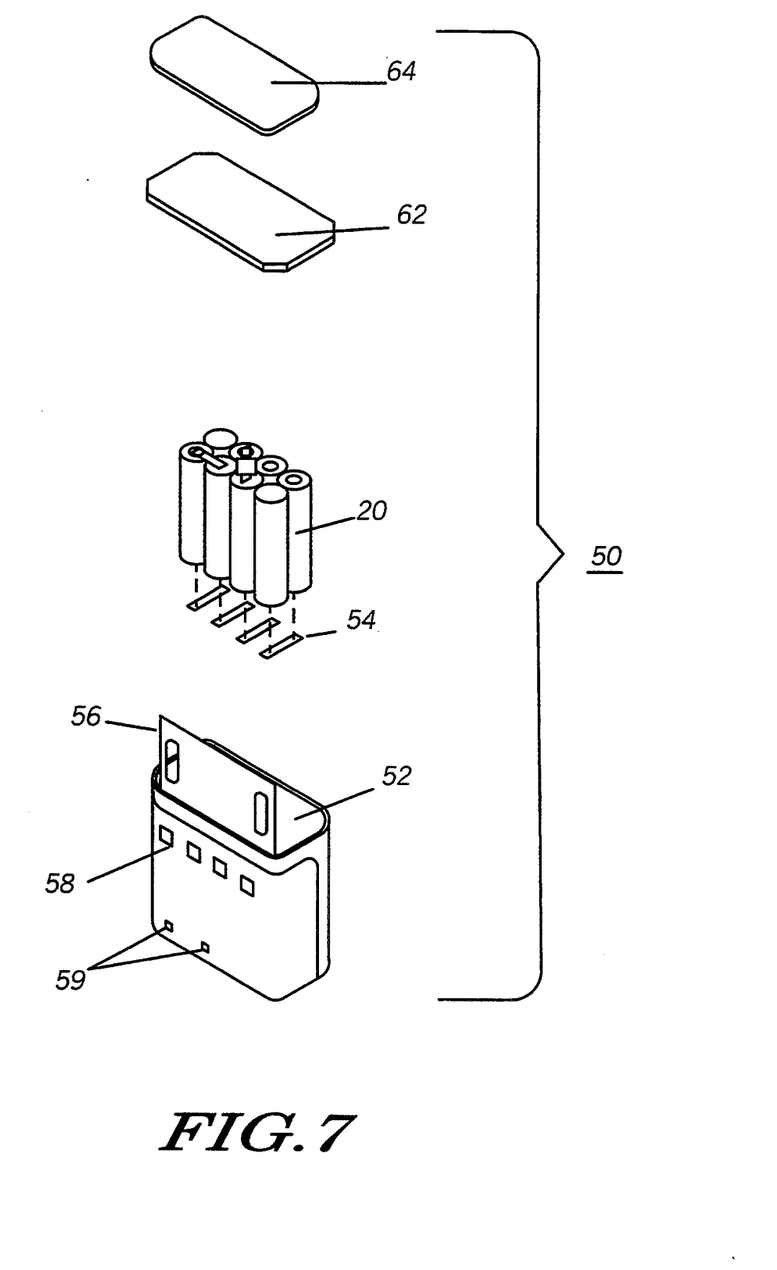
FIG. 7 is an exploded view of a multicell battery for a portable radio made in accordance with the invention.

The electrical energy storage device herein described will find numerous uses, among them, a power source or battery for portable radios or other portable electrical devices. Referring to FIG. 7, a typically multicell battery 50 may be seen that employs the electrical energy storage device 20 of the instant invention. Such a power source typically consists of a housing 52 having electrical contacts for charging 58 and discharging 59. One or more of the electrical energy storage devices 20 may be contained within the housing. The devices 20 are electrically coupled by connecting tabs 54, in a manner to provide the desired amperage and voltage for the battery 50, and this assembly is further connected to a flex circuit 56. The flex circuit 56 is further connected to the charging contacts 58 and the discharging contacts 59. A shock pad or insulator 62 is placed above and/or below the assembled devices 20, and a cover 64 is secured to the housing to close the package.

While the preferred embodiments of the invention have been illustrated and described, it will be clear that the invention is not so limited. Numerous modifications, changes, variations, substitutions and equivalents will readily occur to those skilled in the art without departing from the spirit and scope of the present invention. An electrical energy storage device has been demonstrated to combine the desirable features of precious metal ultracapacitors and conventional electrochemical batteries. It is made at a reasonable cost without the use of rare earth metals.

What is claimed is:

1. A rechargeable electrical energy storage device, comprising an electrochemical cell having two electrodes constructed of a similar organometallic compound, the electrodes being electrically connected by an ion carrying electrolyte and physically separated by a barrier that will pass ions but not electrons.

2. The electrical energy storage device as described in claim 1, wherein either of the electrodes may be the anode or negative electrode.

3. The electrical energy storage device as described in claim 1, wherein either of the electrodes may be the cathode or positive electrode.

4. The electrical energy storage device as described in claim 1, wherein the organometallic compound is blended with or coated with one or more metals selected from the group consisting of Ag, Al, Au, Co, Cr, Cu, Fe, Ir, Mg, Mn, Mo, Ni, Pd, Pt, Ru, Zn, and alloys thereof.

5. The electrical energy storage device as described in claim 1, wherein the organometallic compound is selected from the group consisting of metallocenes, metal porphyrins, metal acetylacetonates, organometallic polymers, and metal bipyridines.

6. The electrical energy storage device as described in claim 5, wherein the organometallic compound is ferrocene, cobalt acetate tetrahydrate, tetrasodium salt of nickel phthalocyaninetetrasulfonic acid, or manganese acetylacetonate.

7. The electrical energy storage device as described in claim 1, wherein the barrier is a separator selected from the group consisting of ion permeable membranes, hydrophillic plastic films, glass, paper, felt, and cellulosic materials.

8. The electrical energy storage device as described in claim 1, further comprising a current collector, wherein the current collector is coated with the organometallic compound.

9. The electrical energy storage device as described in claim 1, wherein the electrolyte is an aqueous solution of acids, bases, or salts.

10. The electrical energy storage device as described in claim 1, wherein the electrolyte is a non-aqueous solution of acids, bases, or salts.

11. The electrical energy storage device as described in claim 1, wherein the current collector is a metal selected from the group consisting of cobalt, copper, gold, iron, manganese, nickel, platinum, silver, tantalum, titanium, zinc, and alloys thereof.

12. A rechargeable electrical energy storage device, comprising an electrochemical cell having two ferrocene electrodes, the electrodes being electrically connected by an acidic electrolyte and physically separated by a barrier that will pass ions but not electrons.

13. The electrical energy storage device as described in claim 12, wherein the electrolyte is dilute sulfuric acid.

14. An electrical energy storage device comprising:
a rechargeable electrochemical cell having two electrodes and an electrolyte, each of the electrodes having a surface comprising an electrochemically active material that provides electron transfer between the electrolyte and the electrochemically active material;
the electrodes are separated by a barrier that passes ions but not electrons; and
the electrochemically active material is composed of one or more organometallic compounds.

15. A process for storing electrical energy in an electrochemical cell having two electrodes, each of the electrodes comprising an organometallic compound, the electrodes being electrically connected by an ion carrying electrolyte and physically separated by a barrier that will pass ions but not electrons, comprising the steps of:

charging the cell by providing an electrical current to the electrodes;

maintaining a potential on the cell until a desired state of charge is obtained; and discharging the cell by using it to power an electrical device.

16. The process of claim 15, further comprising repeating the charging step after the discharging step to recharge the cell for reuse.

17. A rechargeable battery for a portable radio, comprising:

a housing having electrical contacts for charging and discharging;

one or more electrochemical cells contained within the housing, each cell having two electrodes constructed of a similar organometallic compound, the electrodes being electrically connected by an ion carrying electrolyte and physically separated by a barrier that will pass ions but not electrons; and each electrochemical cell electrically connected to the other cells and to the electrical contacts.

* * * * *